United States Patent
Ishida et al.

(10) Patent No.: US 6,639,625 B1
(45) Date of Patent: Oct. 28, 2003

(54) IMAGE SENSING DEVICE

(75) Inventors: Tokuji Ishida, Daito (JP); Shinya Matsuda, Kyoto (JP); Masayuki Ueyama, Takarazuka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/114,138

(22) Filed: Jul. 13, 1998

(30) Foreign Application Priority Data

| Jul. 16, 1997 | (JP) | 9-191325 |
| Jul. 16, 1997 | (JP) | 9-191326 |
| Jul. 16, 1997 | (JP) | 9-191327 |

(51) Int. Cl.[7] ............ H04N 5/225; H04N 7/00
(52) U.S. Cl. .......... 348/218.1; 348/219.1; 348/36; 348/39
(58) Field of Search ............ 348/218, 219, 348/36, 39, 218.1, 219.1

(56) References Cited

U.S. PATENT DOCUMENTS

| 4,660,096 | A | * | 4/1987 | Arlan et al. | 348/218 |
| 5,880,778 | A | * | 3/1999 | Akagi | 348/218 |
| 5,889,553 | A | * | 3/1999 | Kino et al. | 348/218 |
| 5,907,353 | A | * | 5/1999 | Okauchi | 348/218 |
| 6,141,052 | A | * | 10/2000 | Fukumitsu et al. | 348/373 |
| 6,195,125 | B1 | * | 2/2001 | Udagawa et al. | 348/218 |
| 6,278,480 | B1 | * | 8/2001 | Kurahashi et al. | 348/59 |

FOREIGN PATENT DOCUMENTS

| JP | 07170442 | 7/1995 |
| JP | 07177413 | 7/1995 |
| JP | 17231400 | 8/1995 |
| JP | 07322121 | 12/1995 |

* cited by examiner

*Primary Examiner*—Wendy R. Garber
(74) *Attorney, Agent, or Firm*—Burns, Doane, Swecker & Mathis, LLP

(57) ABSTRACT

High resolution composite images and ultra wide composite images are produced in a digital camera which combines a plurality of images to form a composite image on a single sheet. An image sensing unit includes a movable image sensing optical unit having a first and second focal lengths and a two-dimensional image sensing device. The image sensing unit is driven to control the optical axis of the image sensing optical unit so as to capture a plurality of images via the two-dimensional image sensing device. The plurality of images are combined to produce a composite image. An ultra wide composite image at standard resolution is produced by setting the focal length of the image sensing optical unit at a first focal length on the wide angle side, and a high resolution composite image is produced by setting the focal length of the image sensing optical unit at a second focal length on the telephoto side.

28 Claims, 11 Drawing Sheets

IMAGE SENSING DEVICE

This disclosure is based upon Japanese Application Nos. 09-191325, 09191326 and 09-191327, the contents of which are incorporated herein by reference.

BACKGROUND OF THE INVENTION

1. Field of the Invention

The present invention relates to an image sensing device for producing high resolution images and wide images on a single sheet by combining a plurality of digital images.

2. Description of the Related Art

Heretofore, devices have been known which combine a plurality of captured images to produce wide images or high resolution images on a single sheet, using digital image sensing devices. In a first conventional example shown in FIG. 12, a beam splitter 103 is disposed between an image sensing optical unit 101 and two two-dimensional image sensing devices 102a and 102b, so as to bifurcate the luminous flux and, for example, direct the right half of an image to the two-dimensional image sensing device 102a and direct the left half image to the two-dimensional image sensing device 102b. Digital image signals corresponding to the two images received by the two two-dimensional image sensing devices 102a and 102b are processed so as to form a single composite image.

In a second conventional example shown in FIG. 13, a single two-dimensional image sensing device 112 is fixedly attached to a so-called X-Y drive device 113 which moves the two-dimensional image sensing device 112 within an imaging area of image sensing optical unit 111, so as to receive the images of a plurality of different areas (e.g., four locations) 100a–100d of the image sensing range (object) 100, and process digital signals corresponding to each of these images to form a single composite image.

In either of the aforesaid conventional cases, when considering the object as a base, a fixed range is substantially sensed by a plurality of two-dimensional image sensing devices, thereby substantially being equivalent to increasing the number of pixels of the two-dimensional image sensing device to produce a high resolution image. On the other hand, when considering the two-dimensional image sensing device as a base, the images of the objects in different ranges are combined (i.e., pasted), thereby substantially being equivalent to widening the field angle (reducing the focal length) of image sensing optical units 101 and 111 to produce a wide image.

In the aforesaid first and second conventional examples, the image sensing optical units 101 and 111 must have a large imaging area compared to the image sensing surface (pixel region surface area) of the individual two-dimensional image sensing devices 102a, 102b, and 112, thereby increasing the size of the image sensing optical units 101 and 111 themselves. Furthermore, a large size dark box or barrel is required to house the beam splitter 103 and X-Y drive 113 and the like. As a result, the image sensing devices have the disadvantage of an overall large form factor.

Considering the image sensing optical units 101 and 111 as a base, a disadvantage arises in that only standard size images can be produced because wide images produced by combining images are substantially limited to the imaging area of the image sensing optical units 101 and 111.

In the aforesaid first and second conventional examples, disadvantages arise insofar as images are normally combined even when high resolution images are not required, thereby increasing power consumption and processing time used to combine the images.

In the second conventional example, the position of each captured image (i.e., the captured area of the target image sensing range) is dependent on the positioning accuracy of the X-Y drive device 113 because a plurality of images are captured as the two-dimensional image sensing device 112 is moved by the X-Y drive device 113. Accordingly, when the positioning accuracy of the X-Y drive device 113 is low, pixel data loss and overlap occurs in the pasted areas of the images of each region, such that the sharpness of the pasted areas in the combined image is adversely affected. Furthermore, when the image sensing device is disturbed via so-called hand vibration or the like during the movement of the two-dimensional image sensing device 112, pixel data loss and overlap are generated in a wide range near the pasted areas of each image, such that the images cannot be accurately combined, resulting in image degradation.

SUMMARY OF THE INVENTION

An object of the present invention is to eliminate the previously described disadvantages of the aforesaid conventional examples by providing a compact, light weight image sensing device capable of forming composite images at a selectable range by combining a plurality of images, and which is capable of high precision image pasting by correcting disturbances caused by hand vibration.

The aforesaid objects are attained by providing an image sensing device comprising:

a two-dimensional image sensing device which captures the image projected thereon to generate image data;

an optical unit having at least two focal lengths, for projecting an image on the image sensing device;

a focal length control unit which changes the focal length of the optical unit;

a direction control unit which controls the direction of the optical axis of the optical unit;

an image combining unit which combines a plurality of images captured by the image sensing device to form one composite image;

a mode selector which selects either a standard image sensing mode or a high resolution image sensing mode; and an operation control unit which controls the focal length control unit, the direction control unit, the image sensing device, and the image combining unit in accordance with the image sensing mode selected by the mode selector.

When the standard image sensing mode is selected by the mode selector, the operation control unit controls the focal length control unit to set the focal length of the optical unit at a first focal length, and captures the entire target via the image sensing device. When the high resolution mode is selected by the mode selector, the operation control unit controls the focal length control unit to set the focal length of the optical unit at a second focal length longer than the first focal length, and controls the direction control unit to sequentially move the direction of the optical axis of the optical unit toward the center of each area of the target image capture range, which has been divided into a plurality of areas. The image of each area is captured via the image sensing device, and the plurality of captured images are combined via the image combining unit to produce a high resolution composite image of the entire target image.

Hence, the image sensing device of the present invention has a standard mode to capture an image at a standard resolution, and a high resolution mode to capture the image at high resolution, and is capable of switching the image sensing mode as necessary. In the standard image sensing mode, the focal length of the optical unit is set at a first focal length on the short side (i.e., the socalled wide angle side), and in the high resolution mode, the focal length of the image sensing optical unit is set at a second focal length on the long side (i.e., the so-called telephoto side). In the high resolution mode, the target image sensing range is divided into a plurality of areas, and the image of each area is enlarged to the image sensing surface area of the two-dimensional image sensing device and captured. The number of pixels of the two-dimensional image sensing device is effectively increased and a high resolution image of the target image sensing region is produced by combining the captured images.

In the high resolution mode, it is desirable that the focal length of the optical unit is initially set at the first focal length, and the entire image sensing range is captured as a reference image to subsequently form a composite image. That is, although the resolution is not high when the focal length of the optical unit is set at the first focal length on the wide angle side, a reference image without seams can be produced. A combination of images captured at the second focal length on the telephoto side of the optical unit, and particularly the process of pasting images, can be readily accomplished by referring to the aforesaid reference image.

It is desirable that the optical unit be either a bifocal lens or a zoom lens, and the second focal length be an integer multiple of the first focal length. In general, when using a bifocal lens or a zoom lens, the focal length on the so-called telephoto side is often set at an integer multiple of 2× or 3× of the focal length on the wide angle side. For example, when the second focal length is set at about 2× of the first focal length, the target image sensing range is divided into four regions comprising two regions in the lateral direction and two regions in a vertical direction to produce one composite image of the entire target image. In this instance, in the high resolution mode, a resolution of about 4× the resolution of the standard mode can be obtained. Similarly, when the second focal length is set at about 3× the first focal length, a resolution of about 9× the resolution of the standard mode can be obtained in the high resolution mode. When considering errors in pasting each image, it is desirable that the second focal length be set somewhat shorter than an integer multiple of the first focal length.

The image sensing surface area of the two-dimensional image sensing device in the high resolution mode is desirably wider than the surface area of each image combined by the image combining means. That is, in the high resolution mode, the positions of the pasted images can be shifted to adjust for errors of the pasted areas of each image by having the image sensing surface area of the two-dimensional image sensing device wider than the surface area of each image pasted by the image combining means. Furthermore, when the image sensing device is disturbed by "hand vibration" after capturing a specific image and during the capturing of the next image in the high resolution image sensing mode, actual "hand vibration" can be corrected by shifting the positions of the pasted images while referring to the aforesaid reference image.

In the aforesaid construction, it is desirable that the direction control means is a drive mechanism for driving the housing of the image sensing units, containing the image sensing optical unit and the two-dimensional image sensing unit, in a predetermined direction to a predetermined angle. It is also desirable that the direction control means is a movable mirror disposed above the optical axis of the image sensing unit, and drivable in a predetermined direction and predetermined angle. In either case, the imaging area of the image sensing optical unit must at least cover the image sensing range of the two-dimensional image sensing device, and need not be an image sensing optical unit having an imaging area larger than the image sensing range of the two-dimensional image sensing device as in the previously described conventional examples. As a result, the overall image sensing device is lighter in weight and more compact.

As a further feature of the invention, since the image sensing device allows the target image sensing range to be optionally set via the image plane format setting unit, the direction of the optical axis of the image sensing optical unit can be controlled based on the set image plane format to capture images via a two-dimensional image sensing device and paste images via the image combining unit, to form an image of an arbitrary range having a field angle wider than the field angle of the image sensing optical unit. Therefore, the number of composite images is not limited as in the previously described conventional examples, and the composite image range (field angle) may be freely set. Not only may a user set a desired image plane format, the control of the direction of the optical axis of the image sensing optical unit and image combination may be automated.

The image plane format setting unit is preferably capable of setting the vertical and horizontal image planes at respectively identical magnification, as well as respectively different magnifications for enlargement. For example, a so-called zooming effect can be obtained by setting the magnifications of the vertical and horizontal image planes at respectively identical magnification for enlargement. Furthermore, a so-called panorama effect can be obtained by setting the magnification of the horizontal and vertical image planes at respectively different magnifications for enlargement.

The image sensing surface area of the two-dimensional image sensing device is desirably larger than the surface area of the images combined by the image combining unit. Hence, the position of the pasted images can be shifted by having the surface area of the pixel area of the two-dimensional image sensing device slightly larger than the surface area of each of the images pasted by the image combining unit, so as to allow adjustment for error in pasting the images. When the image sensing device is disturbed by hand vibration or the like after a certain image has been captured but before the next image has been captured, the position of the pasted image can be shifted to substantially correct the effects of hand vibration. The imaging area of the image sensing optical unit will cover at least the image sensing region of the two-dimensional image sensing device, so as to render unnecessary an image forming optical unit having an imaging area larger than the image sensing region of the two-dimensional image sensing device, as in the aforesaid conventional examples. As indicated above, therefore, the overall image sensing device is light weight and compact.

As a further feature, the image sensing device of the present invention captures the images near the contiguous area of at least two mutually adjacent images as a reference image and combines a plurality of captured images via the image combining unit with reference to the reference image. As a result processing of the pasted areas of the image, e.g., shifting and comparison of pixel data, can be readily accomplished. For example, when combining four images on two sheets in vertical and lateral order as in the second conventional example, the center of the target image sensing range is designated the reference image. In general, the precision of image combination can be improved by referring to a reference image because an important object is often positioned in the center of the target image sensing range. When pixel data is lost in the pasted areas due to hand vibration or the like, it is possible to correct the effects of the vibration using the pixel data of the reference image.

It is further desirable that flash illumination is used when each image is captured by the two-dimensional image sensing device. Since the emission time of the flash is extremely short, there is no vibration during the capture of a single image by the two-dimensional image sensing device.

DESCRIPTION OF THE PREFERRED EMBODIMENTS

First Embodiment

Figure 1:
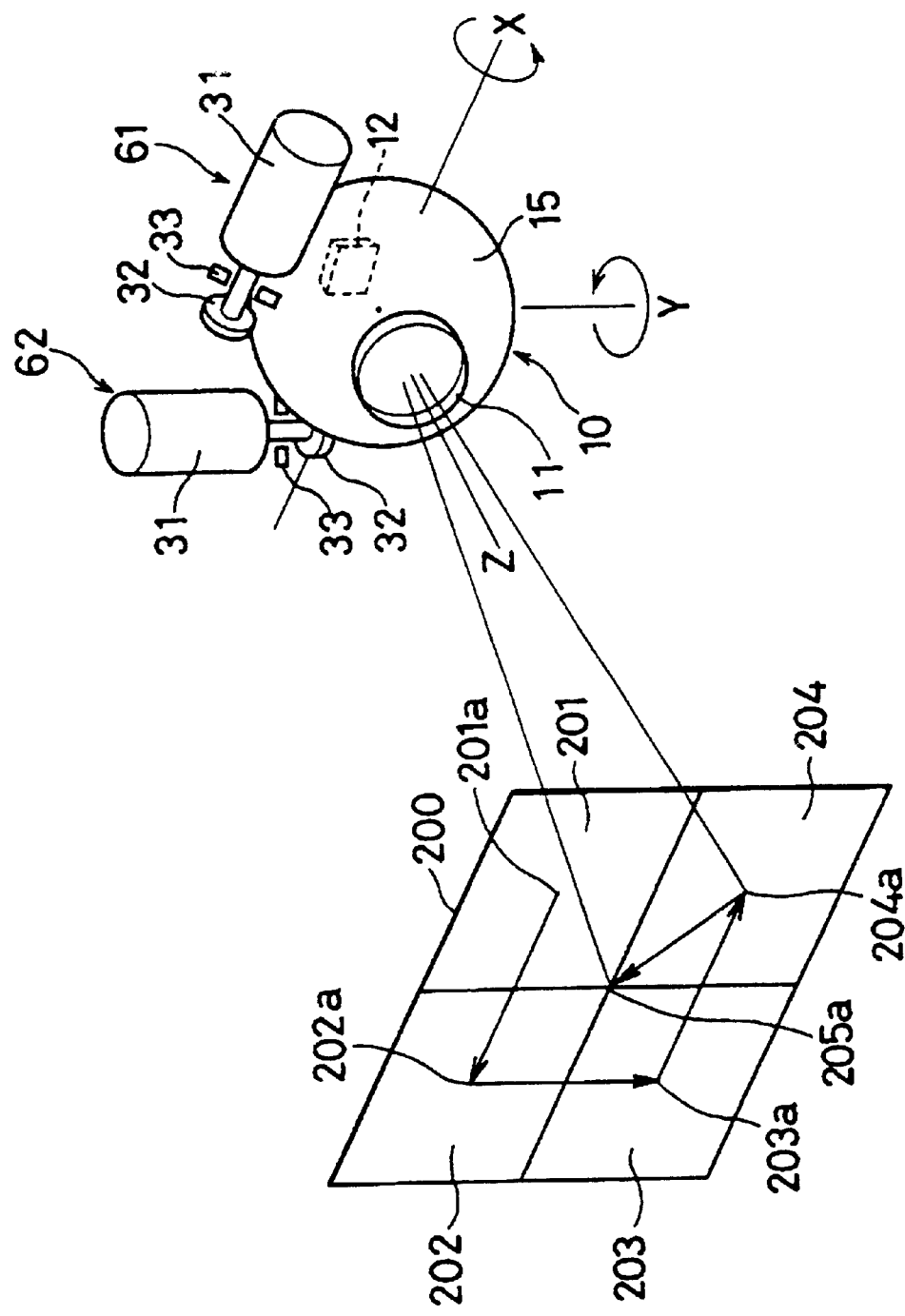
FIG. 1 is a perspective view showing the construction of the image sensing unit and its drive mechanisms in a first embodiment of the image sensing device of the present invention.

A first embodiment of the image sensing device of the present invention is described hereinafter with reference to the drawings. FIG. 1 is a perspective view showing the construction of the image sensing device of the first embodiment, and FIG. 2 is a section view showing the construction of the device in the initial state, and FIG. 3 is a section view showing the device in the operating state.

Figure 2:
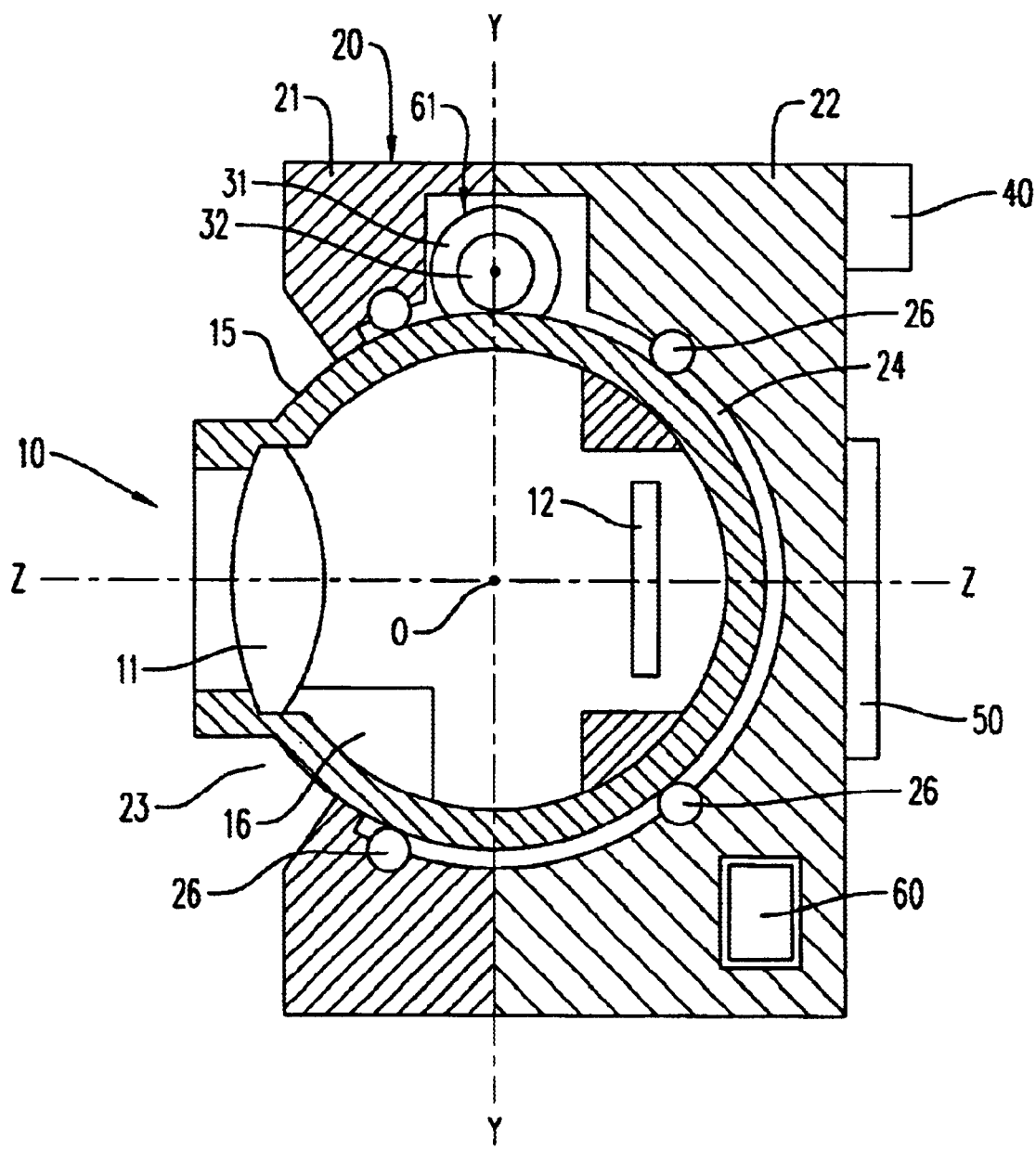
FIG. 2 is a section view showing the construction of the image sensing unit and the initial state of its housing in the first embodiment of the image sensing device of the present invention.
Figure 3:
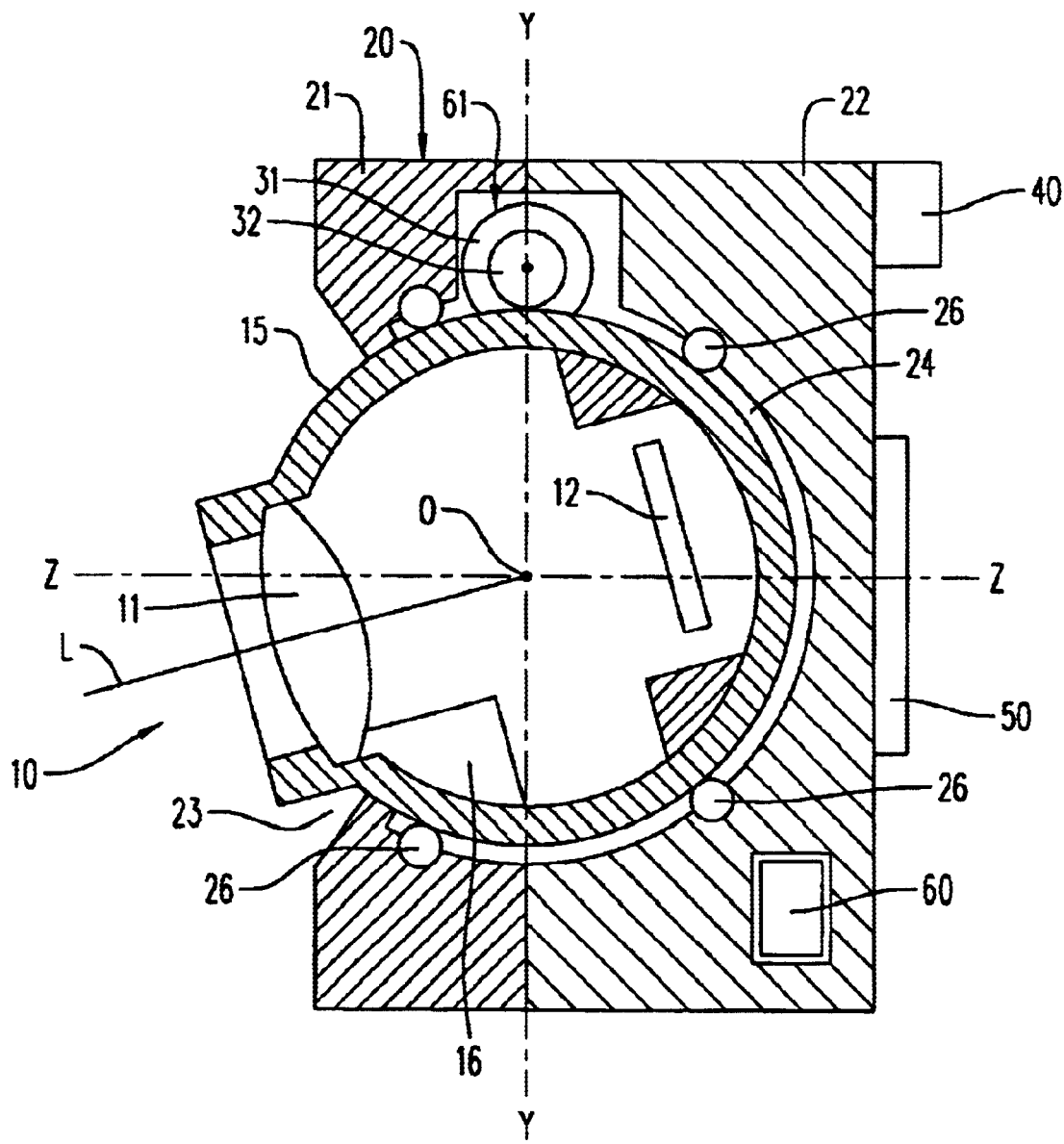
FIG. 3 is a section view showing the construction of the image sensing unit and the operating state of its housing in a first embodiment of the image sensing device of the present invention.

As shown in FIGS. 1–3, the image sensing unit 10 has an exterior surface 15 which is at least partially spherical. As shown in FIGS. 2 and 3, a two-dimensional image sensing device 12 having image sensing elements such as charge-coupled devices (CCD) arranged in a planar array, and lens drive mechanism 16 for controlling the focal length and focus position of the image sensing optical unit 11 are disposed within the image sensing unit 10. Image sensing optical unit 11 comprises a bifocal lens or a zoom lens, and the shortest focal length (i.e., the wide angle end) is designated the first focal length, and the longest focal length (i.e., telephoto end) is designated the second focal length. For example, the second focal length can be an integer multiple (e.g., about 2x) of the first focal length.

As shown in FIGS. 2 and 3, a housing 20 comprises two sections 21 and 22, and has an approximately spherical cavity 24 for accommodating the image sensing unit 10. An opening 23 is formed on the anterior surface of housing 20, and part of the image sensing optical unit 11 of the image sensing unit 10 extends from this opening 23. A plurality of ball bearings 26 are provided between the concave spherical surface of the cavity 24 and the convex spherical surface of the exterior surface 15 of image sensing unit 10, so as to maintain the free rotation of the image sensing unit 10 around orthogonal axes through the center 0 of the sphere of image sensing unit 10, as well as reduce the rotational load on the image sensing unit 10.

As shown in FIG. 1, an X drive mechanism 61 and a Y drive mechanism 62 are respectively provided at the top and side of image sensing unit 10. The X drive mechanism 61 and the Y drive mechanism 62 respectively comprise a motor 31, flexible roller 32 formed of rubber or the like, and an encoder 33, and rotate the image sensing unit 10 relative to the X axis and Y axis by moving the sphere of the exterior surface 15 of the image sensing unit 10 via the flexible rollers 32. Detection signals output by each encoder 33 are received by a controller 60 provided within the housing 20, the rotational angle (amount of rotation) of the image sensing unit 10 in the X-axis direction and Y-axis direction are calculated, and the calculated result is specified as the axial direction of the image sensing optical unit 11.

Figure 4:
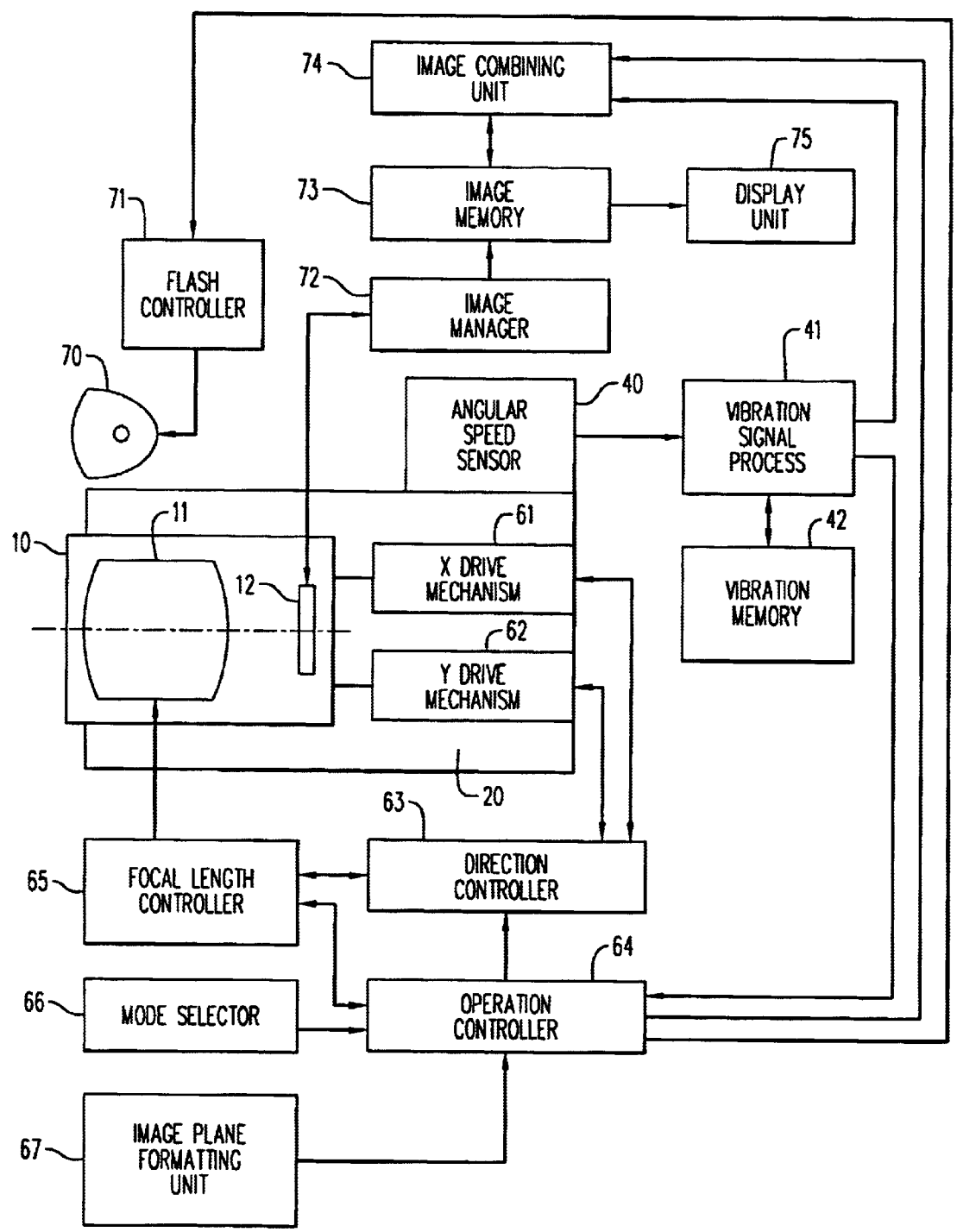
FIG. 4 is a block diagram showing the construction of the control unit of the first embodiment of the image sensing device of the present invention.

As shown in FIGS. 2 and 3, an angular speed sensor 40 and switch panel 50 are provided on housing 20. Angular speed sensor 40 detects the amount of movement and the direction of movement when the image sensing device is disturbed by, for example, hand vibration after capturing a certain image and during capturing of the next image via the two-dimensional image sensing device 12. As described later, so-called hand vibration can be corrected based on the amount of movement and direction of movement of the image sensing device. Switch panel 50 functions as an input device (image plane formatting unit 67 in FIG. 4) for setting the image format and switching between the standard image sensing mode and the high resolution image sensing mode (mode selection unit 66 in FIG. 4) described later. As shown in FIG. 4, a flash unit 70 may be provided separately or integrated with the image sensing device.

FIG. 4 is a block diagram of the construction of the components of the unit 10, particularly the controller 60. The motors 31 of the X drive mechanism 61 and Y drive mechanism 62 are driven a specific number of rotations in a forward direction or reverse direction in accordance with control signals from a direction controller 63, and the number (or amount) of rotations of the motors detected by encoders 33 are fed back to direction controller 63. As a result, the optical axis of the image sensing optical unit 11 of the image sensing device 10 is oriented in a predetermined direction.

A focal length controller 65 includes lens drive mechanism 16 (FIGS. 2 and 3) for controlling the focal length and focus position of image sensing optical unit 11 provided in image sensing unit 10. Focal length controller 65 changes the focal length of image sensing optical unit 11 in accordance with control signals from an operation controller 64, and outputs center-of-gravity information and focal length information and the like for image sensing optical unit 11 to direction controller 63 and operation controller 64.

Switch panel 50 provided on the housing 20 of the image sensing device functions as a mode selector 66, and an image plane formatting unit 67. Mode selector 66 selects one image sensing mode among either of two image sensing modes, i.e., a standard image sensing mode for capturing an image at standard resolution, and a high resolution image sensing mode for capturing the image at high resolution. Image plane formatting unit 67 is used to set the vertical and horizontal image plane displayed on display unit 75 at an identical arbitrary magnification or at different arbitrary magnifications.

Angular speed sensor 40 provided on housing 20 detects the acceleration of the image sensing device (i.e., housing 20) in the X-axis direction and Y-axis direction after capturing a specific image until capturing of the next image by the two-dimensional image sensing device 12, and outputs a detection signal to a vibration signal processor 41. Vibration signal processor 41 calculates the amount of movement in the X-axis direction and Y-axis direction based on the signals output by angular speed sensor 40, and stores the calculation result in a vibration memory 42 and outputs this data to operation controller 64.

Operation controller 64 sets the target image sensing range in accordance with the image plane format set by the image plane formatting unit 67 and the image sensing mode selected by mode selector 66, and calculates the number of divisions of the target image sensing region (i.e., the number of images to be captured by the two-dimensional image sensing device 12) and center position of these divisions in accordance with the focal length (field angle) of the image sensing optical unit 11, and controls the X drive mechanism 61 and Y drive mechanism 62 via the direction controller 63. When the image sensing device is disturbed by hand vibration or the like, the amount of drive of the X drive mechanism 61 and Y drive mechanism 62 can be corrected based on the output signals from vibration signal processor 41 and focal length information from focal length controller 65.

Two-dimensional image sensing device 12 outputs to an image manager 72 analog signals corresponding to the charge accumulated in each pixel, in accordance with control signals from image manager 72. Image manager 72 converts the analog signals from the two-dimensional image sensing device 12 to digital signals, and temporarily stores these digital signals in an image memory 73. An image combining unit 74 pastes together a plurality of sets of image data stored in image memory 73 so as to form composite image data. The composite image data are again stored in image memory 73, and reconverted to NTSC signals or the like for display on a display unit 75 such as a monitor display device or the like. Operation controller 65 controls a flash controller 71 as necessary so as to actuate a flash unit 70 synchronously with the image capturing by the two-dimensional image sensing unit 12.

(1-1) Image Sensing Operation with Standard Image Plane Size

The image sensing operations in the standard image sensing mode and high resolution image sensing mode are described hereinafter for the case when the image plane is set at a standard size by the image plane formatting unit 67. Mode selector 66 switches between the standard image sensing mode and the high resolution image sensing mode.

When the standard image sensing mode has been set by mode selector 66, operation controller 64 controls the focal length controller 65 to set the focal length of image sensing optical unit 11 at an arbitrary focal length (i.e., an arbitrary focal length of either a first focal length or second focal length when the image sensing optical unit 11 is a zoom lens), and captures the image of the target image sensing region via a single image sensing operation by the two-dimensional image sensing device 12.

Figure 5:
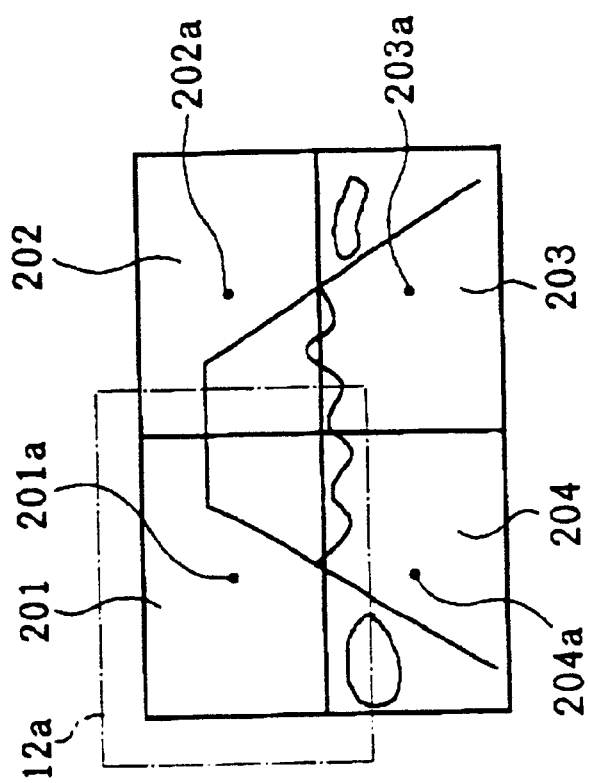
FIG. 5(a) illustrates a first example of an image in the standard mode in a first embodiment of the image sensing device of the present invention.
FIG. 5(b) shows a composite image in the high resolution image sensing mode.
Figure 5:
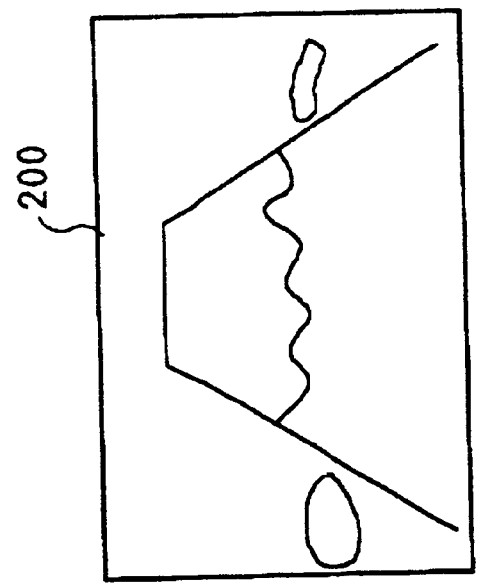

When the high resolution image sensing mode is selected, the operation controller 64 first controls the focal length controller 65 to set the focal length of the image sensing optical unit 11 at a first focal length on the short focal length side, and controls the image manager 72 to capture a reference image 200 of the wide target image capturing region via a single image sensing operation of the two-dimensional image sensing device 12, as shown in FIG. 5(a). Image manager 72 subjects the captured image data to analog-to-digital (A/D) conversion, and stores the converted data in image memory 73. Then, operation controller 64 controls the focal length controller 65 to set the focal length of the image sensing optical unit 11 at the second focal length on the long side (i.e., the so-called telephoto side). For example, when the second focal length is approximately 2× the first focal length, the direction controller 63 divides the target image sensing range into first through fourth regions 201–204, and calculates the amount of drive for the X drive mechanism 61 and Y drive mechanism 62 to sequentially move the optical axis of the image sensing optical unit 11 toward the centers 201a–204a of the division areas 201–204, as shown in FIG. 5(b). Then, the operation controller 64 controls the image manager 72 to drive the image sensing unit 10 via direction controller 63 to sequentially capture an enlarged image on the image sensing plane of two-dimensional image sensing device 12 for each of the regions 201–204. Image manager 72 subjects the image data of each captured region 201–204 to A/D conversion and stores the converted data in image memory 73.

Image combining unit 74 combines the image data of the divided first through fourth regions 201–204 while referring to the reference image 200 previously stored in image memory 73 to form high resolution composite image data of the entire target, image sensing range. Then, the composite image data is stored in image memory 73 and displayed on display unit 75. The composite image displayed on display unit 75 is equivalent to an image captured by a two-dimensional image sensing device 12 having approximately 4× the number of pixels as the actual two-dimensional image sensing device 12, thereby producing a high resolution image.

Parts corresponding to the images of the first through fourth regions 201–204 combined in the image data of reference image 200 are substantially identical to the image data of the respective first through fourth regions 201–204 (e.g., when focusing on the capture line of the pasted areas, these areas have the same periodicity of brightness and darkness). Therefore, areas of matching periodicity can be found by comparing the image data of each region 201–204 and the reference image 200. As a result, the processing of pasted areas of an image is readily accomplished.

In consideration of errors in the pasted areas of an image, the second focal length of the image sensing optical unit 11 is slightly shorter than an integer multiple of the first focal length. Furthermore, the image sensing surface area of the two-dimensional image sensing device 12 (surface area of the pixels) is slightly larger than the surface area of the images 201–204 combined by the image combining unit in the high resolution mode. In either case, for example, when considering first image area 201, the image substantially obtained by two-dimensional image sensing device 12 is larger than the first image area 201 as indicated by the dashed line 12a in FIG. 4(b). As a result, the capturing position of the images of the first through fourth image areas 201–204 can be shifted so as to adjust for errors of the pasted areas. Furthermore, when the image sensing device is disturbed by hand vibration after a certain image has been captured and during the capturing of a subsequent image by the two-dimensional image sensing device 12, the hand vibration effect can substantially be corrected by shifting the image capturing position of the pasted first through fourth regions 201–204 while referring to the aforesaid reference image.

(1-2) Image Sensing Operation In Standard Image Sensing Mode with Ultra Wide

Image Plane

The image sensing operation described below pertains to an ultra wide image plane exceeding the image sensing region at the first focal length when the image sensing optical unit 11 is set on the wide angle side by the image plane formatter 67 as the image plane format.

Figure 6:
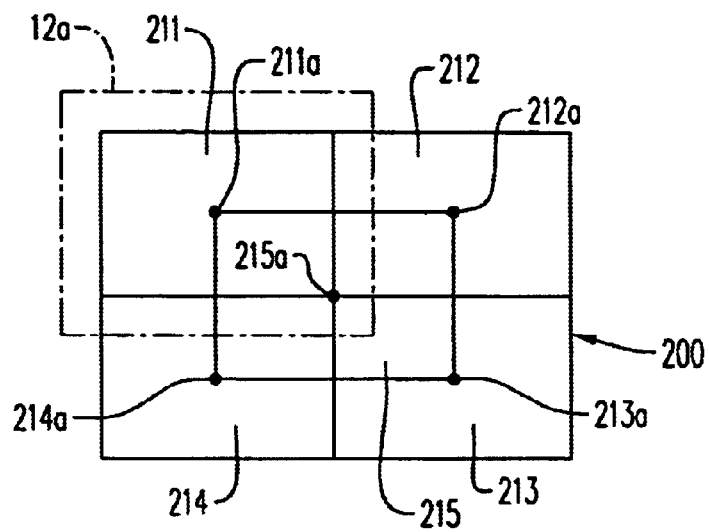
FIG. 6 shows an example of a method of combining ultra wide images in a second example of the first embodiment of the image sensing device of the present invention.

Consider the case of an ultra wide image having a field angle of about 2× relative to the field angle obtained when the focal length of the image sensing optical unit is set at the first focal length on the wide angle side. Operation controller 64 controls the focal length controller 65 to set the focal length of the image sensing optical unit 11 at the first focal length on the short side. Direction controller 63 divides the target image sensing region shown in FIG. 6 into first through fourth regions 211–214, and calculates the amount of drive of X drive mechanism 61 and Y drive mechanism 62 to shift the optical axis of the image sensing optical unit 11 toward the centers 211a–214a of divided regions 211–214 and the center 215a of the central fifth region 215. Then, operation controller 64 controls the image manager 72 to drive the image sensing unit via direction controller 63 to capture the image formed on the image sensing plane of regions 211–215 sequentially from the first region 211 to the fifth region 215. Image manager 72 subjects the image data of the captured regions 211–215 to A/D conversion and stores the converted data in image memory 73.

Image combining unit 74 combines the image data of the first through fourth regions 211–214 using the image of the fifth region 215 at a central position in the target image sensing range 200 as a reference image to form composite image data of the entire target image sensing range 200. Then, the composite image data is stored in image memory 73 and displayed on display unit 75. The composite image displayed on display unit 75 is equivalent to an image captured by an image sensing optical unit substantially having 2× the field angle obtained when the first focal length of the image sensing optical unit 11 is set, thereby producing an ultra wide image.

Figure 7:
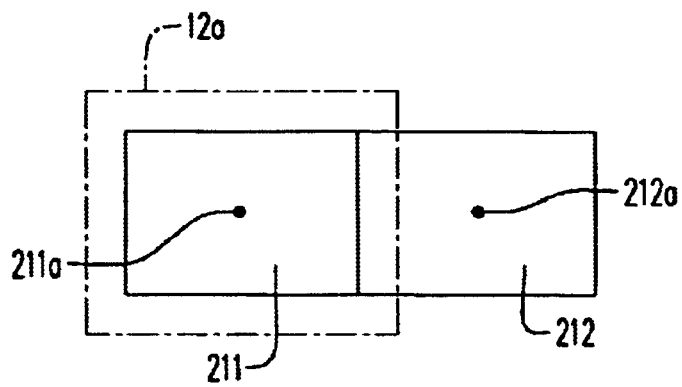
FIG. 7 shows an example of a method of combining images having a length in the horizontal direction in the second example of the first embodiment of the image sensing device of the present invention.
Figure 8:
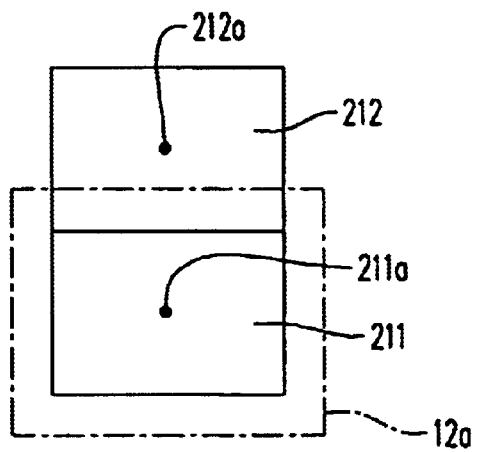
FIG. 8 shows an example of a method of combining images having a length in the vertical direction in the second example of the first embodiment of the image sensing device of the present invention.

Although the vertical and horizontal image plane has been discussed in terms of enlargement at equal magnifications in so-called zooming, it is to be noted, for example, that the magnification in the horizontal direction may be greater than the magnification in the vertical direction as shown in FIG. 7, and the magnification in the vertical direction may be greater than the magnification in the horizontal direction as shown in FIG. 8. Since it is difficult to switch from the horizontal and vertical in the case of conventional digital cameras, the construction shown in FIG. 8 is effective when the image sensing range (object) has a vertical length.

The capturing position of the image of the first through fourth regions 211–214 can be shifted by having the surface area of the pixel area 12a of the two-dimensional image sensing device 12 be larger than the surface area of the individual images 211–214 that are combined by the image combining unit 74, thereby allowing adjustment for errors in the pasted areas. When the image sensing device is disturbed by hand vibration or the like, the effect of this hand vibration can be corrected by shifting the captured position of the images of the pasted first through fourth regions 211–214 using the image of the aforesaid fifth region 215 as a reference image.

(1-3) Image Sensing Operation in High Resolution Mode

The image sensing operation in the high resolution image sensing mode is described below when an image plane format is set by the image plane formatting unit 67.

When the high resolution image sensing mode is selected by the mode selector 66, the operation controller 64 controls the focal length controller to set the focal length of the image sensing optical unit 11 at the second focal length on the telephoto side (this may be an arbitrary focal length on the telephoto side in the case of a zoom lens). Direction controller 63 divides the target image sensing range into a predetermined number of areas based on the magnifications in the vertical direction and horizontal direction set by the image plane formatting unit 67. For example, in the instance shown in FIG. 9(a), since the vertical direction and horizontal direction are both set at a magnification of approximately 1.7×, the direction controller 63 divides the target image sensing range into four regions comprising first through fourth areas 201–204, and controls the X drive mechanism 61 and Y drive mechanism 62 so as to sequentially move the optical axis of the image sensing optical unit 11 toward the centers 201a–204a of the divided areas to have the images of each area 201–204 combined with partial overlap. The sequence of image combination is identical to that described in section (1-1). When compared to the high resolution image (approximately 2× magnification in the vertical direction and horizontal direction) in the first embodiment, zooming occurs on the telephoto side in the high resolution image sensing mode.

Figure 9:
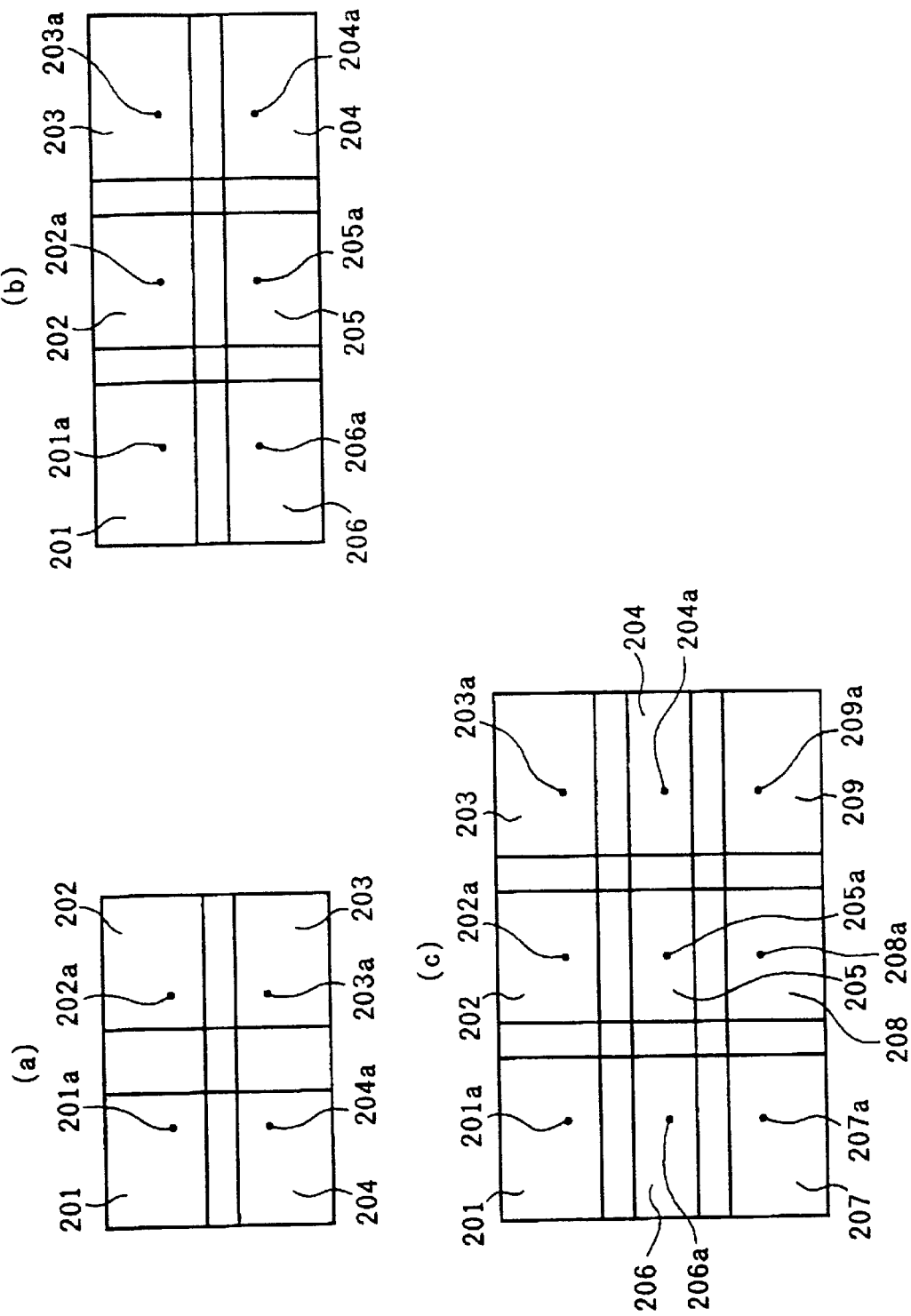
FIG. 9(a) shows a telephoto side zoomed image in the high resolution image sensing mode in a third example of the first embodiment of the image sensing device of the present invention.
FIG. 9(b) shows a panorama image having length in the horizontal direction in the high resolution image sensing mode.
FIG. 9(c) shows a wide angle side zoomed image in the high resolution image sensing mode.

When the vertical direction magnification is set at approximately 1.7×, and the horizontal magnification is set at approximately 2.7× as shown in FIG. 9(b), the direction controller 63 divides the target image sensing range into six areas comprising three columns in the horizontal direction and two levels in the vertical direction, and controls the X drive mechanism 61 and Y drive mechanism 62 so as to move the optical axis of the image sensing optical unit 11 toward the centers 201a–206a of the divided areas 201–206 to combine the images of the first through sixth areas 201–206 with partial overlap. The sequence of image combination is identical to that described in section (1-1). In this instance, a wide image is obtained in the high resolution image sensing mode.

Since the vertical direction magnification and horizontal magnification are both set at approximately 2.7× in the example shown in FIG. 9(c), the direction controller 63 divides the target image sensing range into nine areas comprising three columns in the horizontal direction and three levels in the vertical direction, and controls the X drive mechanism 61 and Y drive mechanism 62 so as to move the optical axis of the image sensing optical unit 11 toward the centers 201a–209a of divided areas 201–209 to combine the images of areas 201–209 with partial overlap. The sequence of image combination is identical to that of the first embodiment. When this instance is compared to the high resolution image (both vertical direction and horizontal direction magnification of approximately 2×) of the first embodiment shown in FIG. 5(b), zooming is accomplished on the wide angle side in the high resolution image sensing mode.

(1-4) Correction of Hand Vibration

Correction of hand vibration effects using the output signals from the angular speed sensor 40 is described below.

Consider, for example, combining images of four areas to form a composite image as shown in FIG. 5(b). In the case of a digital camera, the time required to capture the image of one region is approximately 30 msec. In general, the image flow (so-called hand vibration in still cameras using silver salt film) when capturing the image of a single area is considered to be small. When the target image sensing range (object) is dark, the flash controller 71 may be controlled to actuate the flash unit 70. When the time required after capturing the image of a certain area by two-dimensional image sensing device 12, driving the X drive mechanism 61 and Y drive mechanism 62, and capturing the image of the next area is set at 50–100 msec, a time of 0.3–0.5 sec is required to capture the images of all four areas. When using a handheld image sensing device, hand vibration (the same concept as hand vibration in video cameras) may occur during this period, so as to cause dislocation of the relationships among the images of the four areas.

When hand vibration occurs, angular speed sensor 40 detects the acceleration in the X-axis direction and Y-axis direction, and the vibration signal processor 41 calculates the amount of movement and direction of the vibration from the output signals of angular speed sensor 40, and stores the signals corresponding to the amount of movement and vibration direction in vibration memory 42, and outputs this data to the operation controller 64.

Figure 10:
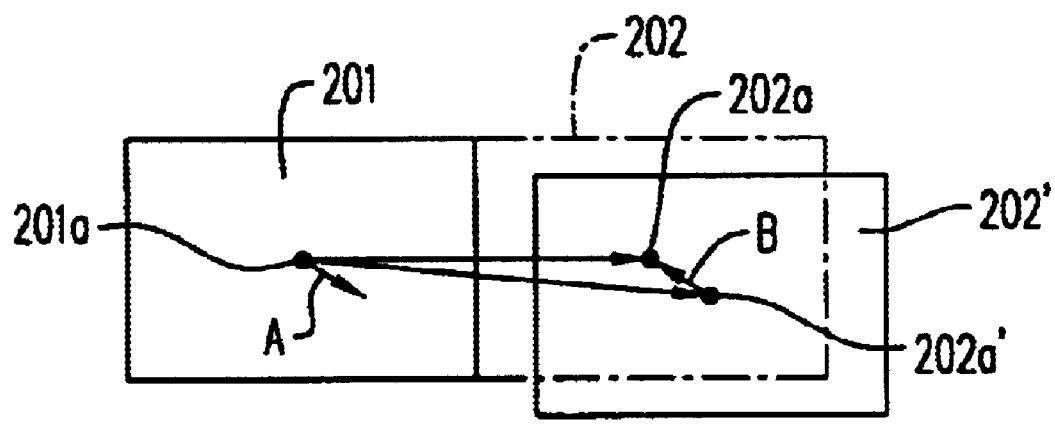
FIG. 10 shows an example of a hand vibration correction method in a fourth example of the first embodiment of the image sensing device of the present invention.

In FIG. 10, hand vibration A is generated after capturing the image of first area 201 and before the capturing of the second area 202. When the X drive mechanism 61 and Y drive mechanism 62 are driven in accordance with a previously calculated drive amount, the optical axis of the image sensing optical unit 11 is not moved toward the center 202a of the original second area 202 indicated by the dashed line in the drawing, but rather is moved toward the center 202a' of the current second area 202' indicated by the solid line in the drawing. Operation controller 64 calculates the correction amount B in the opposite direction to the hand vibration direction using the signals corresponding to the amount of movement and vibration direction from vibration signal processor 41, and outputs this calculation data to direction controller 63. Direction controller 63 drives the X drive mechanism 61 and Y drive mechanism 62 using the corrected drive amount calculated using correction amount B. As a result, an image of an area virtually identical to the original second area 202 indicated by the dashed line is captured by the two-dimensional image sensing device 12, and the composite image shows no evidence of so-called hand vibration.

As previously described in sections (1-1) to (1-3), when the image sensing area 12a of two-dimensional image sensing device 12 is larger than the areas 201, 202 and the like combined by image combining unit 74, the vibration signal processor 41 outputs signals corresponding to the vibration direction and amount of movement to the image combining unit 74, the image capturing position the moved area 202 is shifted in the opposite direction to the vibration direction by the aforesaid amount of movement so as to correct the effects of hand vibration.

Although the image sensing optical unit 11 has been described in terms of a zoom lens or a bifocal lens having at least a first focal length and second focal length in sections (1-1) to (1-4), it is to be understood that a single focus lens may achieve similar effectiveness for the individual operations described in sections (1-2) to (1-4), for the case in which there may not be a need to switch between a standard mode and a high-resolution mode.

Second Embodiment

Figure 11:
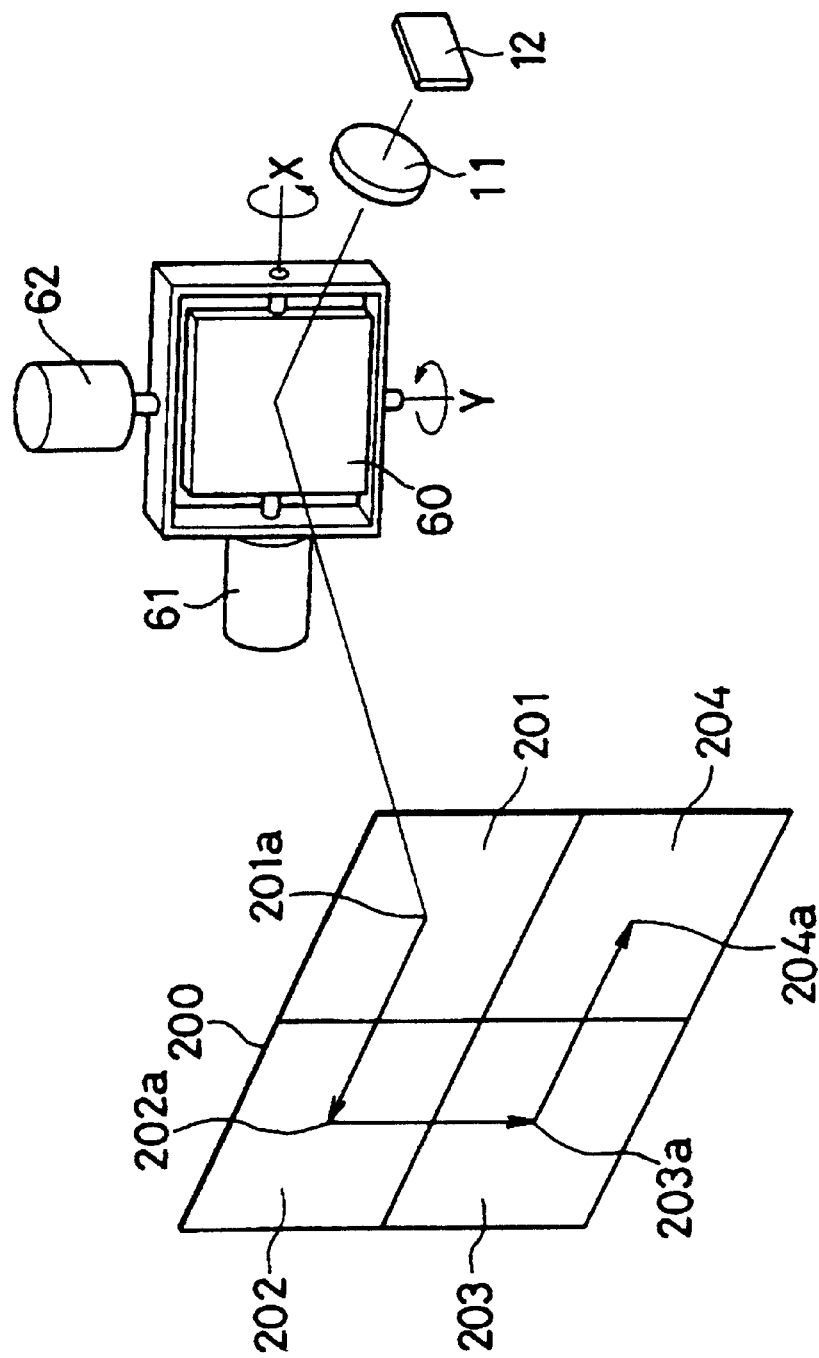
FIG. 11 is a perspective view showing the construction of an image sensing unit and its drive mechanisms in a second embodiment of the image sensing device of the present.invention.
Figure 12:
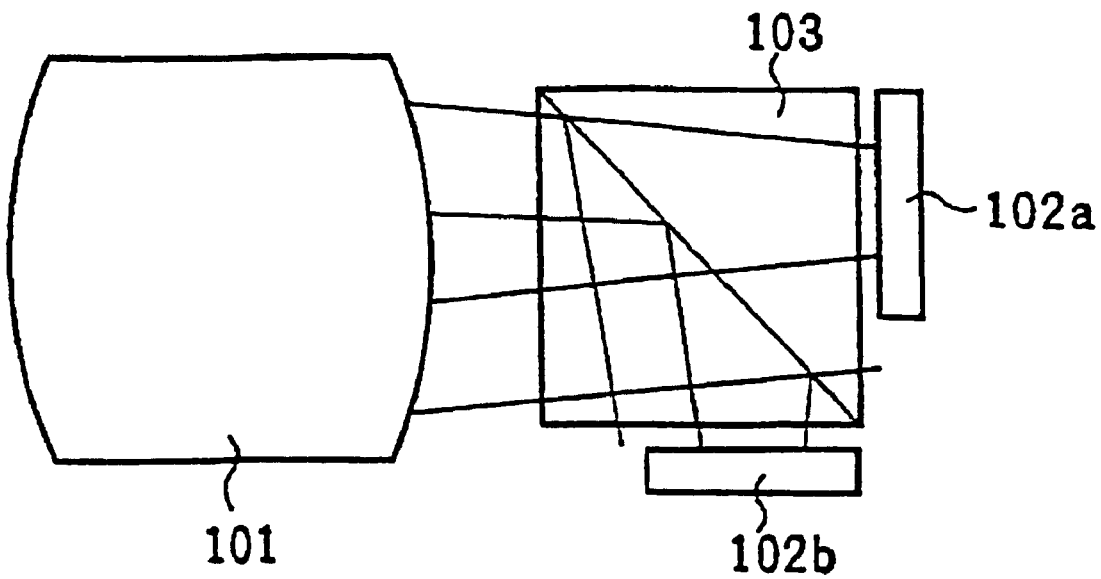
FIG. 12 shows the construction of a first conventional image sensing device.
Figure 13:
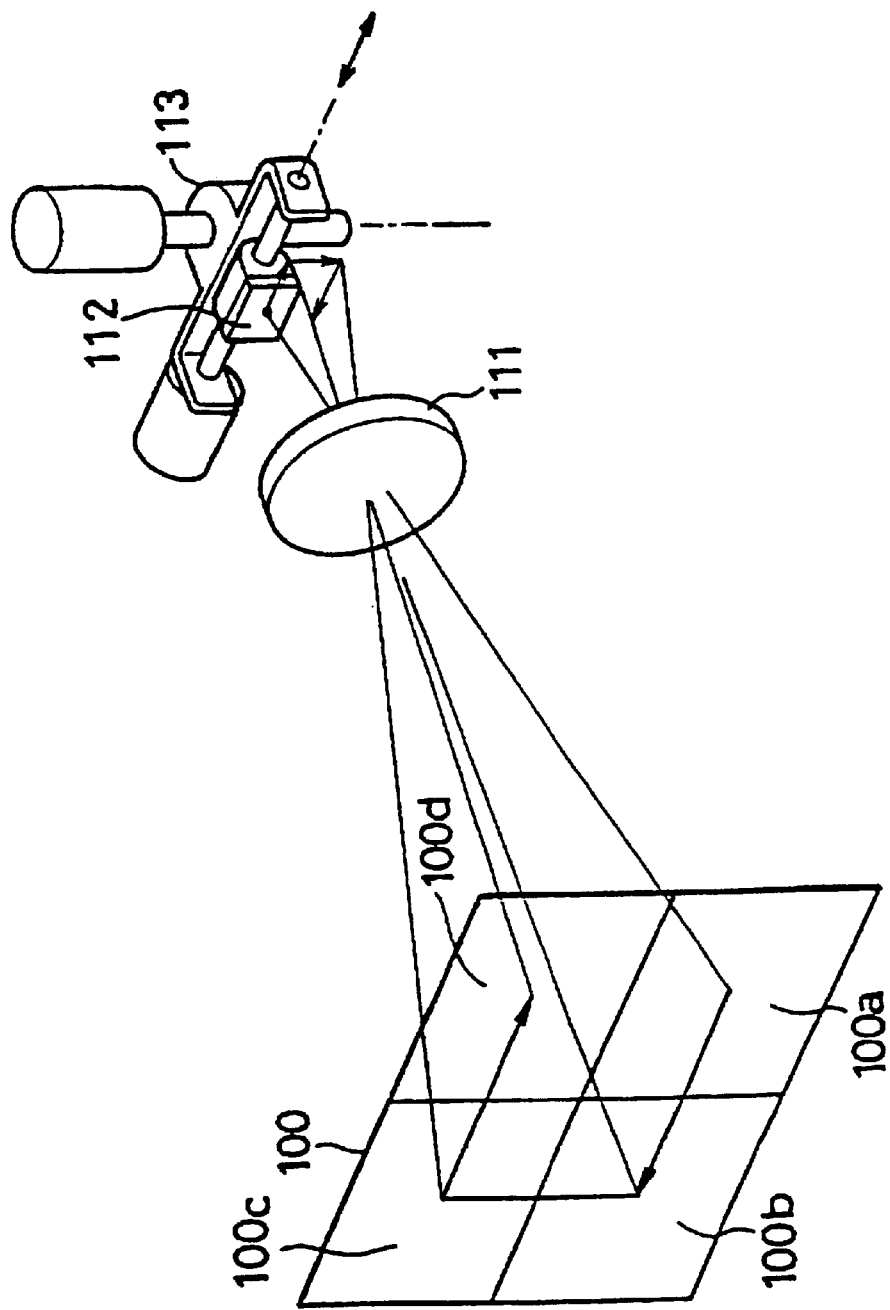
FIG. 13 is a perspective view showing the construction of a second conventional image sensing device.

A second embodiment of the image sensing device of the present invention is described hereinafter with reference to FIG. 11. FIG. 11 is a perspective view showing the construction of the image sensing device of the second embodiment. Whereas in the first embodiment an image sensing optical unit 11 and two-dimensional image sensing device 12 are provided within image sensing unit 10, and the direction of the optical axis of the image sensing optical unit 11 is controlled by moving the entirety of the image sensing unit 10, in the second embodiment the image sensing unit 11 and the two-dimensional image sensing device 12 are fixedly attached to the image sensing device body (not illustrated), a mirror 60 having a gimbal structure disposed on the optical axis of the image sensing optical unit 11 is driven in rotation about the X axis and Y axis via X drive mechanism 61 and Y drive mechanism 62. In the second embodiment, therefore, although the mechanism for controlling the optical axis of the image sensing optical unit 11 is different, the control method is identical to that of the previously described first embodiment. For this reason a description of the control method of the second embodiment is omitted.

The image sensing device of the present invention allows selection of either a standard image sensing mode or a high resolution image sensing mode by the mode selection means, and when the standard image sensing mode is selected, sets the focal length of the image sensing optical unit at a first focal length to capture the image of the entire target image sensing range via a two-dimensional image sensing device, and when the high resolution image sensing mode is selected, sets the focal length of the image sensing optical unit at a second focal length which is longer than the first focal length, and sequentially moves the direction of the optical axis of the image sensing optical unit toward the center of each area of a plurality of divided areas of the target image sensing range, and captures each area via the two-dimensional image sensing device, and combines the plurality of captured images to produce a high resolution composite image of the entire target image sensing range, such that in the high resolution image sensing mode the number of pixels of the two-dimensional image sensing device is effectively increased to produce a high resolution image of the entire target image sensing range.

Furthermore, in the high resolution image sensing mode, the focal length of the image sensing optical unit is set at a first focal length to capture a reference image of the entire target image sensing range so as to refer to a seamless reference image when combining images via reference to the reference image, such that the combining of images captured at a second focal length on the telephoto side of the image sensing optical unit can be easily accomplished and processing of the pasted areas of such images can be readily accomplished.

When either a bifocal lens or a zoom lens is selected in the image sensing optical unit and the second focal length is set approximately at an integer multiple of a first focal length, for example, when the second focal length is approximately 2× the first focal length, a resolution approximately 4× the resolution of the standard mode can be achieved in the high resolution mode. Similarly, when the second focal length is set at approximately 3× the first focal length, a resolution approximately 9× the resolution of the standard mode can be achieved in the high resolution mode.

The capturing position of each image can be shifted so as to adjust for errors of the pasted areas by making the image sensing surface area (i.e., the pixel area) of the two-dimensional image sensing device larger than the surface area of each individual image that is combined by the composite image means in the high resolution mode. For example, when the image sensing device is disturbed by hand vibration or the like after a certain image has been captured and before the next image has been captured in the high resolution image sensing mode, the image capturing position can be shifted for pasting while referring to the aforesaid reference image so as to substantially correct the effects of hand vibration.

The direction control means may be a drive mechanism for driving the housing of the image sensing unit containing a built-in image sensing optical unit and two-dimensional image sensing device in a predetermined direction and predetermined angle, or a movable mirror disposed above the optical axis of the image sensing unit and drivable in a predetermined direction and predetermined angle so as to reduce the imaging area of the image sensing optical unit to a degree which at least covers the image sensing range of the two-dimensional image sensing device to render the overall image sensing device in a light weight, compact form factor.

What is claimed is:

1. An image sensing device comprising:
   a two-dimensional image sensor which captures an image projected thereon to generate image data;
   an optical unit having at least two focal lengths, said optical unit projecting an image on said image sensor;
   a focal length control unit which changes the focal length of said optical unit;
   a direction control unit which controls the direction of the optical axis of said optical unit;
   an image combining unit which combines a plurality of images captured by said image sensor to form a composite image;
   a mode selector which selects either a standard image sensing mode or a high resolution image sensing mode; and
   an operation control unit which controls said focal length control unit, said direction control unit, said image sensor, and said image combining unit in accordance with the image sensing mode selected by said mode selector;
   wherein, when said standard image sensing mode is selected by said mode selector, said operation control unit controls said focal length control unit to set the focal length of said optical unit at a first focal length, and captures the entire target via said image sensor; and
   wherein, when said high resolution mode is selected by said mode selector, said operation control unit controls said focal length control unit to set the focal length of said optical unit at said first focal length and captures a reference image of the entire target, and controls said focal length control unit to set the focal length of said optical unit at a second focal length longer than said first focal length, and controls said direction control unit to sequentially move the direction of the optical axis of said optical unit toward the center of each area of a target image capture range which has been divided into a plurality of areas, and captures the image of each said area via said image sensor, and combines said plurality of captured images with reference to said reference image via said image combining unit to produce a high resolution composite image of the entire target image.

2. The image sensing device claimed in claim 1, wherein said optical unit includes one of a bifocal lens or a zoom lens, and said second focal length is an integer multiple of said first focal length.

3. The image sensing device claimed in claim 1, wherein the image sensing surface area of said image sensor in said high resolution mode is greater than the surface area of the individual images corresponding to said area that are combined by said image combining means.

4. The image sensing device claimed in claim 1, wherein said direction control unit is a movable mirror disposed on the optical axis of said image sensing unit and is driven in a predetermined direction to a predetermined angle.

5. The image sensing device claimed in claim 1, wherein said direction control unit is a drive mechanism which drives a housing containing said optical unit and said image sensor in a predetermined direction to a predetermined angle.

6. An image forming device comprising:
   an optical unit;
   a two-dimensional image sensor which captures an image projected thereon by said optical unit to generate image data;
   a direction control unit comprising a drive mechanism for driving a housing accommodating said optical unit and said two-dimensional image sensor in a predetermined direction to a predetermined angle, to thereby control the direction of the optical axis of said optical unit;
   an image combining unit which combines a plurality of images captured by said two-dimensional image sensor to form a composite image of a target image;
   an image plane format setting unit which sets the target image sensing range to be captured; and
   an operation control unit which calculates the number of images captured by said two-dimensional image sensor and the direction of the optical axis of said optical unit capturing said images from a target image sensing range set by said image plane format setting unit, and controls said direction control unit, said two-dimensional image sensor, and said image combining unit based on said calculation results.

7. The image forming device claimed in claim 6, wherein the image sensing surface area of said two-dimensional image sensor is larger than the surface area of the individual images that are combined by said image combining unit.

8. The image forming device claimed in claim 6, wherein said direction control unit is a movable mirror disposed along the optical axis of said image sensing unit that is in a predetermined direction to a predetermined angle.

9. The image forming device of claim 6, wherein said image plane format setting unit is capable of setting the vertical and horizontal image planes at respectively different optional magnifications for enlargement.

10. An image forming device comprising:
an optical unit;
a two-dimensional image sensor which captures an image projected thereon by said optical unit;
a direction control unit which controls the direction of the optical axis of said optical unit;
an image combining unit which combines a plurality of images captured by said two-dimensional image sensor to form a composite image of a target image; and
an operation control unit which controls said direction control unit, said two-dimensional image sensor, and said image combining unit,
wherein said operation control unit controls said direction control unit to sequentially move the direction of the optical axis of said optical unit toward the center of each area of a target image divided into a plurality of areas, so as to capture the image of each area by said two-dimensional image sensor, and captures an a separate image near the adjacent area of at least two mutually adjacent areas among the areas of said divided target image as a reference image, and combines a plurality of captured images by said image combining unit while referring to said separate reference image to produce a composite image of the entire target image.

11. The image forming device claimed in claim 10, further including a hand vibration detection unit to correct the direction of the optical axis of said optical unit by said direction control unit using a vibration amount detected by said hand vibration detecting unit.

12. The image forming device claimed in claim 10, further including a hand vibration detection unit for detecting vibration during movement of the optical axis of said optical unit, and a vibration amount memory to store said detected vibration amount, and wherein the image sensing surface area of said two-dimensional image sensor is larger than the surface area of each individual image that is combined by said image combining unit, so as to correct mutual dislocation of combined images using the vibration amount detected by said hand vibration detection unit.

13. The image forming device claimed in claim 10, wherein flash illumination is executed when capturing images by said two-dimensional image sensor.

14. The image forming device claimed in claim 10, wherein said direction control unit is a drive mechanism for driving a housing accommodating said optical unit and said two-dimensional image sensor in a predetermined direction to a predetermined angle.

15. The image forming device claimed in claim 10, wherein said direction control unit is a movable mirror disposed along the optical axis of said optical unit and driven in a predetermined direction to a predetermined angle.

16. A method for sensing an image, comprising the steps of:
projecting an image on a two-dimensional image sensing device by means of an optical unit having at least two focal lengths;
selecting either a standard image sensing mode or a high resolution image sensing mode;
setting the focal length of said optical unit at a first focal length, and capturing the entire image via said sensing device when said standard image sensing mode is selected by said mode selector; and
when the high resolution image sensing mode is selected, capturing a reference image of the entire target image sensing range with the focal length of said optical unit set at said first focal length, and setting the focal length of said optical unit at a second focal length longer than said first focal length, sequentially moving the direction of the optical axis of said optical unit toward the center of each area of a target image capture range which has been divided into a plurality of areas, capturing the image of each said area via said sensing device, and combining said plurality of captured images with reference to said reference image to produce a high resolution composite image of the entire target image.

17. The method claimed in claim 16, wherein said second focal length is an integer multiple of said first focal length.

18. The method claimed in claim 16, wherein the image sensing surface area of said image sensing device in said high resolution mode is greater than the surface area of the individual images that are combined by said image combining means.

19. A method for forming an image, comprising the steps of:
capturing an image projected on a two-dimensional image sensing device by an optical unit;
sequentially moving the direction of the optical axis of said optical unit toward the center of each area of a target image divided into a plurality of areas, so as to capture the image of each area by said two-dimensional image sensing device;
capturing a separate image near the adjacent area of at least two mutually adjacent areas among the areas of said divided target image as a reference image; and
combining a plurality of captured images while referring to said separate reference image to produce a composite image of the target image.

20. The method claimed in claim 19, further including the steps of detecting vibration of said optical unit, and correcting the direction of the optical axis of said optical unit using a detected vibration amount.

21. The method claimed in claim 19, further including the steps of detecting vibration during movement of the optical axis of said optical unit, storing said detected vibration amount, and correcting mutual dislocation of combined images using the detected vibration amount.

22. The method claimed in claim 19, further including the steps of providing flash illumination when capturing images by said two-dimensional image sensor.

23. An image forming device comprising:
an optical unit having at least two focal lengths;
a focal length control unit which changes the focal length of said optical unit;
a two-dimensional image sensor which captures an image projected thereon by said optical unit to generate image data;
a direction control unit which controls the direction of the optical axis of said optical unit;
an image combining unit which combines a plurality of images captured by said two-dimensional image sensor to form a composite image of a target image;
an image plane format setting unit which sets the target image sensing range to be captured; and
an operation control unit which controls said focal length control unit, said direction control unit, said two-dimensional image sensor, and said image combining unit based upon a target image capturing range set by said image plane format setting unit to produce an image plane exceeding the image sensing region at a first focal length on the short focal length side.

24. An image forming device claimed in claim 23, wherein said operation control unit sets the number of images captured by said two-dimensional image sensor and the direction of the optical axis of said optical unit in accordance with said first focal length.

25. An image forming device claimed in claim 23, wherein said operation control unit sets the number of images captured by said two-dimensional image sensor and the direction of the optical axis of said optical unit in accordance with a second focal length longer than said first focal length.

26. A method for forming an image, comprising the steps of:

- projecting an image on a two-dimensional image sensor by means of an optical unit having at least two focal lengths;
- setting a target image sensing range to be captured;
- setting the focal length of said optical unit;
- controlling the direction of the optical axis of said optical unit based on said target image sensing range;
- capturing each of said images in said target image sensing range; and
- combining the images captured by said two-dimensional image sensor to produce an image plane exceeding the image sensing region at a first focal length on a short focal length side.

27. The method claimed in claim 26, further comprising the step of:

- setting the number of images captured by said two-dimensional image sensor and the direction of the optical axis of said optical unit in accordance with said first focal length.

28. The method claimed in claim 26, further comprising the step of:

- setting the number of images captured by said two-dimensional image sensor and the direction of the optical axis of said optical unit in accordance with a second focal length longer than said first focal length.

* * * * *